Aug. 21, 1923.  N. A. BURGESS  1,465,892
TONGS
Filed June 28, 1922
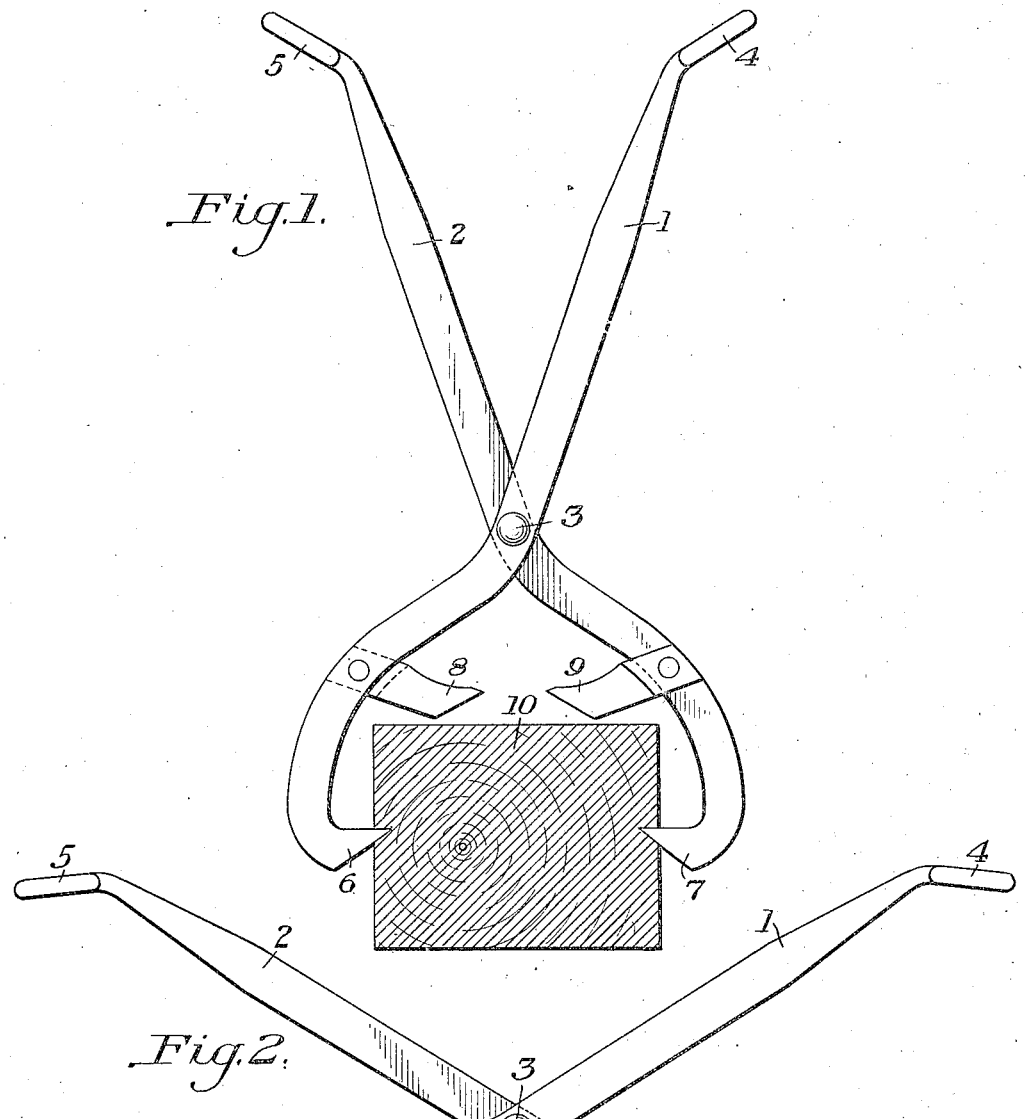
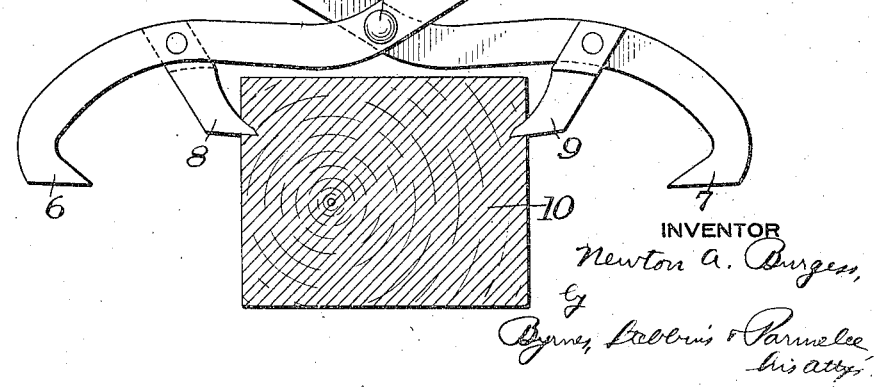

Patented Aug. 21, 1923.

1,465,892

UNITED STATES PATENT OFFICE.

NEWTON A. BURGESS, OF PITTSBURGH, PENNSYLVANIA, ASSIGNOR TO VERONA TOOL WORKS, OF VERONA, PENNSYLVANIA, A CORPORATION OF PENNSYLVANIA.

TONGS.

Application filed June 28, 1922. Serial No. 571,544.

*To all whom it may concern:*

Be it known that I, NEWTON A. BURGESS, a citizen of the United States, residing at Pittsburgh, in the county of Allegheny and State of Pennsylvania, have invented a new and useful Improvement in Tongs, of which the following is a full, clear, and exact description.

My invention relates to tongs, and particularly to such tongs known as tie tongs.

An object of my invention is the provision of such a device of simple construction and which may be used for handling ties or other articles by a single person or by two or more persons.

My invention will be better understood by reference to the accompanying drawings illustrating one embodiment of my invention, and in which—

Figure 1 shows an application of the tongs to a railway tie in position to be handled by one person; and Figure 2 shows an application of the tongs to a similar article in position to be handled by two or more persons.

The device comprises a pair of members 1 and 2 pivoted at 3. The upper end of the member 1 is provided with a handle 4, while the upper end of the member 2 is provided with a handle 5. The other end of the member 1 is provided with a lifting member 6; and the other end of the member 2 is provided with a lifting member 7. The member 1 is also provided with a lifting member 8 intermediate the lifting member 6 and the pivot 3; and the member 2 is provided with a corresponding lifting member 9 intermediate the lifting member 7 and the pivot 3. When it is desired to handle the tie 10, or other similar article, by a single person, the tongs are applied to the tie, as shown in Figure 1, so that the handles 4 and 5 come close together and may be readily grasped by the hands of the operator for the intended purpose. In that application of the device it will be noted that the lifting members 6 and 7 engage the tie and the members 8 and 9 are above and out of engagement with the top of the tie.

When it is desired that the tongs should be applied so that two or more persons may carry or otherwise manipulate it, the tongs are spread out in the position shown in Figure 2, and the lifting members 8 and 9 engage the tie. This results in greatly spreading the handles 4 and 5 apart so that one of said handles may be grasped by one person and the other by another. The lifting members 6 and 7 are free, as shown in Figure 2.

It will be noted that the member 9 is placed on one side of the member 2 and the member 8 on the opposite side of the member 1, so that when the tongs are closed the members 8 and 9 do not engage each other.

My invention has several advantages, resulting from the simple construction and the provision of the lifting members so that the lifting members on each of the members 1 and 2 extend in the same direction; as a result of the foregoing arrangement, the members 6 and 7, when in the position shown in Figure 2, extend inwardly away from the limbs and feet of the operators, thus avoiding the possibility of an accident resulting from engagement with the sharp points of said members.

While I have shown and described one embodiment of my device in detail, I do not desire to be limited to the exact arrangement shown, as changes may be made in the details thereof without departing from the spirit of my invention.

I claim:

Tongs comprising two crossed members pivoted together, and a pair of similar tie engaging projections on each of said crossed members, the projections of each pair pointing in the same general direction and both pairs of projections being materially below said pivotal connection whereby one of the projections of each pair is adapted to engage a tie with the crossed members in substantially vertical position and the other of the projections of each pair is adapted to engage the same tie without reversing the handles and with the crossed members in substantially horizontal position, one of each of said pair of projections being so secured to its respective member as to prevent reversal of the members and bring the ends of said projections into proper cooperating relation, substantially as described.

In testimony whereof I have hereunto set my hand.

NEWTON A. BURGESS.